US006704116B1

(12) United States Patent
Abulhab

(10) Patent No.: US 6,704,116 B1
(45) Date of Patent: Mar. 9, 2004

(54) METHOD AND FONT FOR REPRESENTING ARABIC CHARACTERS, AND ARTICLES UTILIZING THEM

(76) Inventor: Saad D. Abulhab, P.O. Box 1745, New York, NY (US) 10163

( * ) Notice: Subject to any disclaimer, the term of this patent is extended or adjusted under 35 U.S.C. 154(b) by 0 days.

(21) Appl. No.: 09/377,395

(22) Filed: Aug. 19, 1999

(51) Int. Cl.[7] .............................................. G06F 15/00
(52) U.S. Cl. ........................ 358/1.11; 358/1.9; 358/448
(58) Field of Search ......................... 358/1.2, 1.9, 1.11, 358/448, 452, 467, 470; 345/468, 471

(56) References Cited

U.S. PATENT DOCUMENTS 5,416,898 A * 5/1995 Opstad et al. ............... 345/468

* cited by examiner

Primary Examiner—Mark Wallerson
(74) Attorney, Agent, or Firm—Richard B. Klar

(57) ABSTRACT

A method of, and a font for, representing the extended arabic characters in which a distinctive Arabic based alphabet of minimum constant number of letters would include characters that have unique non-varying glyph representations, detachable forms to render non-cursive strings, and generally symmetric outlines to facilitate bi-directional utilization. Each glyph in the new font has the core characteristics of its traditional Arabic equivalent so that words and text strings utilizing new font and method will closely resemble traditional Arabic. Unlike prior art Arabic fonts and the systems employing them, the invention introduces a significantly smaller font size and a platform independent font-only based character input/output method or system eliminating previously required glyph and ligature substitutions and allowing bi-directional and non-cursive rendering. Articles utilizing the present invention, such as computerized systems, transparencies, or language learning tools, can overcome much of the currently based system complexity.

28 Claims, 16 Drawing Sheets

|   | 062 | 063 | 064 | 065 | 066 | 067 | 068 | 069 | 06A | 06B | 06C | 06D |
|---|---|---|---|---|---|---|---|---|---|---|---|---|
| 0 |   | ڎ | ؎ |   |   | ' | ڨ | ة | ڪ | ګ | ڠ | ۍ |
| 1 | ؁ | ا | ؑ |   |   | ئ | ݝ | ت | ګ | ګ | ۀ | ێ |
| 2 | ؂ | ج | ؒ | ٠ |   | ا | ݞ | ث | ݢ | ګ | ۂ | ۏ |
| 3 | ؃ | س | ؓ | ٣ |   | ا | ݟ | ج | ݣ | ݣ | ۃ | ۓ |
| 4 | ؄ | ش | ؔ | ٤ |   | ا | ݠ | ح | ݤ | ݤ | ۄ | - |
| 5 | ؅ | ص | ؕ | ٥ |   | ٮ | ݡ | خ | ݥ | ݥ | ۅ | ە |
| 6 | ؆ | ض | ؖ |   |   | ٻ | ݢ | د | ݦ | ݦ | ۆ |   |
| 7 | ؇ | ط | ؗ |   |   | پ | ݣ | ذ | ݧ | ݧ | ۇ |   |
| 8 | ؈ | ظ | و |   |   | ٿ | ݤ | ر | ݨ |   | ۈ |   |
| 9 | ؉ | ع | ى |   |   | ٹ | ڊ | ز | ݩ | ݩ | ۉ |   |
| A | ؊ | غ | ي |   |   | ڀ | ڋ | ݪ | ݪ | ݫ | ۊ |   |
| B | ؋ |   |   |   |   | ٻ | ڌ | ݫ | ݫ | ݬ | ۋ |   |
| C | ، |   |   |   |   | ٽ | ڍ | ݬ | ݬ | ݭ | ی |   |
| D | ؍ |   |   |   |   | ٺ | ڎ | ݭ | ݭ | ݮ | ۍ |   |
| E | ؎ |   |   |   |   | ٿ | ڏ | ݮ | ݮ | ݯ | ێ |   |
| F | ؏ |   |   |   |   | ڀ | ڐ | ݯ | ݯ | ݰ | ۏ |   |

New Arabic font (Right to Left)

ميحرلا نمحرلا هللا مسب

اهمحلا هلل بر نيملاعلا. نمحرلا ميحرلا. كلام موي نيدلا. كايإ دبعن كايإو نيعتسن. اندهإ طارصلا ميقتسملا. طارص نيذللا تمعنأ مهيلع ريغ بوضغملا مهيلع الو نيلاضلا.

قدص هللا ميظعلا.

New Arabic font (Left to Right)

بسم الله الرحمن الرحيم

الحمد لله رب العالمين. الرحمن الرحيم. مالك يوم الدين. إياك نعبد وإياك نستعين. إهدنا الصراط المستقيم. صراط اللذين أنعمت عليهم غير المغضوب عليهم ولا الضالين.

صدق الله العظيم.

TraditionalArabic (Right to Left)

Figure 7

| New Arabic (Left to Right) | | New Arabic (Right to Left) | Traditional Arabic (Right to Left) |
|---|---|---|---|
| هلللا | ↔ | االله | الله |
| تمحم | ↔ | محمت | محمد |
| توت | ↔ | توت | توت |
| ءامس | ↔ | سماء | سماء |
| دارم | ↔ | مراد | مراد |
| ةملك | ↔ | كلمة | كلمة |
| ناسنالا | ↔ | الانسان | الانسان |
| قارعلا | ↔ | العراق | العراق |
| فراع | ↔ | عارف | عارف |
| ةرهاقلا | ↔ | القاهرة | القاهرة |
| ردب | ↔ | بدر | بدر |
| ئدابم | ↔ | مبادئ | مبادئ |
| يلع | ↔ | علي | علي |
| ديز | ↔ | زيد | زيد |
| سمش | ↔ | شمس | شمس |
| ىده | ↔ | هدى | هدى |
| ضايرلا | ↔ | الرياض | الرياض |
| ةوقلا | ↔ | القوة | القوة |
| ذالم | ↔ | ملاذ | ملاذ |

Figure 8

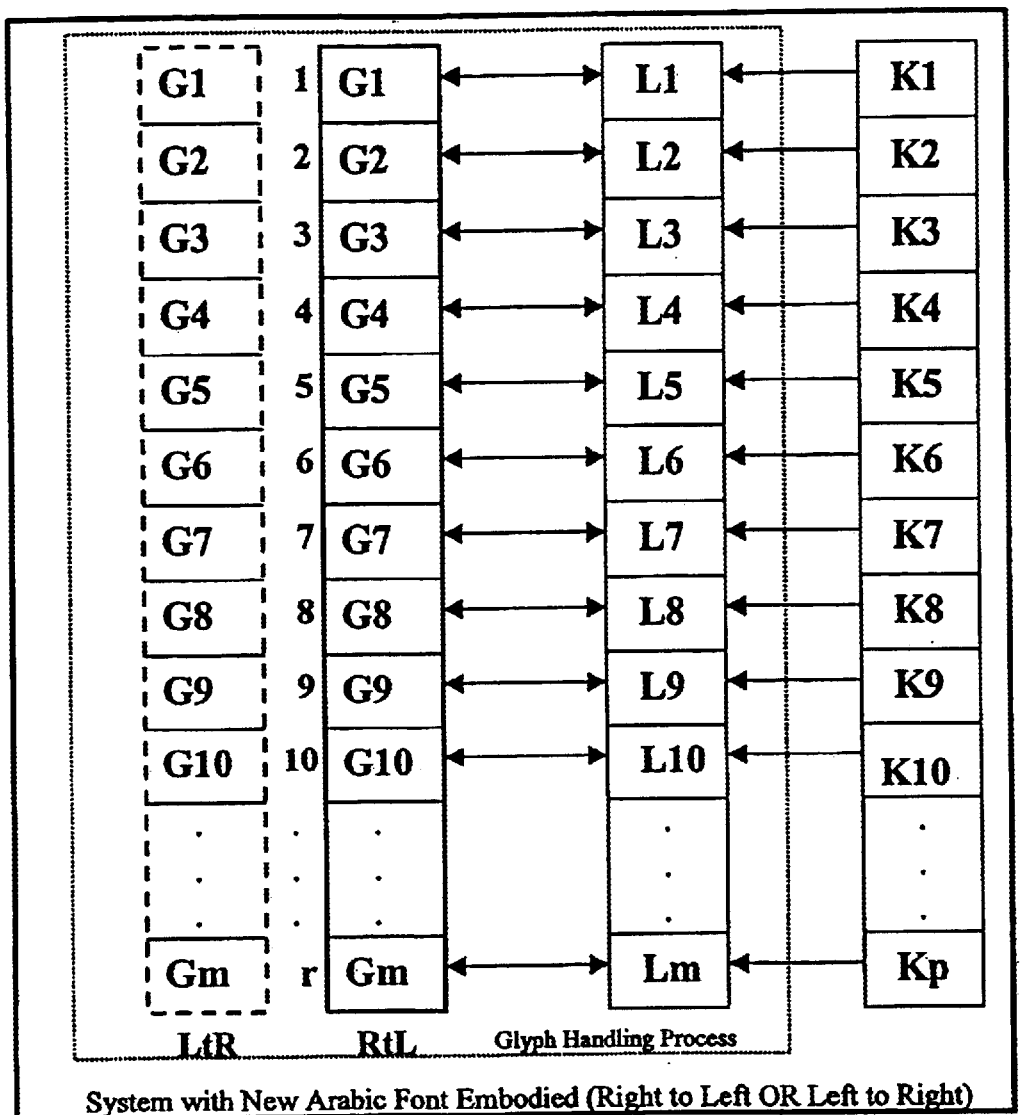
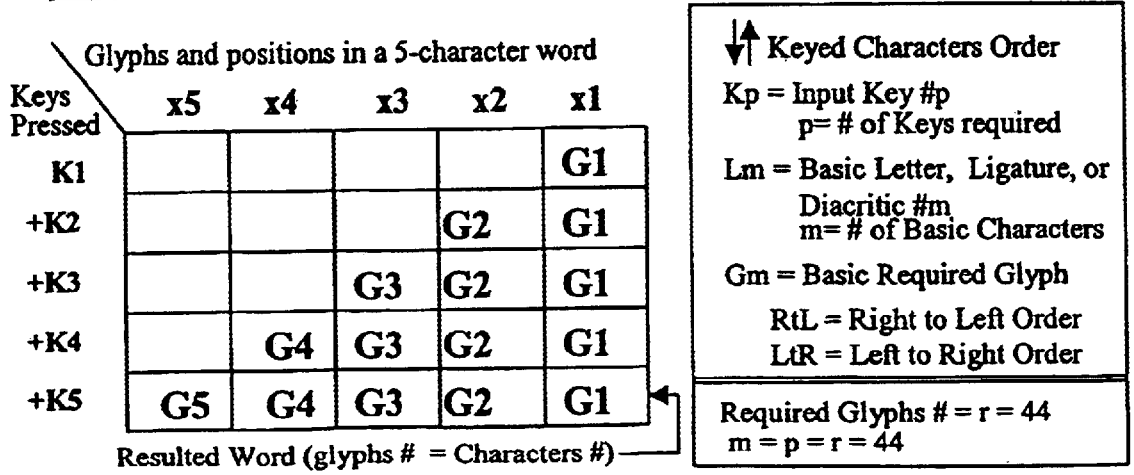
Figure 10

| Including Lam-Alif and Alif-Lam Ligatures ||| No Lam-Alif or Alif-Lam Ligatures |
| --- | --- | --- | --- |
| Option 4 | Option 3 | Option 2 | |
|  |  | الله | الله |
|  | الإسلام | الإسلام | الإسلام |
|  | الاسلام | الاسلام | الاسلام |
|  |  | الإنسان | الإنسان |
|  |  | الإنسان | الإنسان |
|  |  | ملاطفة | ملاطفة |
|  | الفوهلات | الفوهلات | الفوهلات |
|  |  | القاهرة | القاهرة |
|  | المال | المال | المال |
|  |  | مال | مال |
|  |  | مقال | مقال |
| اللاة | اللاة | اللاة | اللاة |

METHOD AND FONT FOR REPRESENTING ARABIC CHARACTERS, AND ARTICLES UTILIZING THEM

BACKGROUND OF THE INVENTION

1. Field of the Invention

The present invention relates to articles having thereon, utilizing or employing a font and a method for representing Arabic characters. In particular, the present invention relates to articles which have thereon, utilizing or employing a font based system of characters representative of the extended Arabic characters that are generally symmetric to facilitate bi-directional use, uniform to render a single glyph per letter, and detachable to compose non cursive strings output.

2. The Prior Art

To represent the Arabic language digitally, mechanically or in ways other than by the common human hand writing, a minimum set of 44 basic glyphs must be created to represent the letters, diacritics and ligatures needed for reading and writing Arabic. Extended Arabic, used by more than 21 distinct non-Arabic languages (e.g. Urdu, Persian and Kurdish), contains some additional 96 basic glyphs, mostly derived from the original Arabic. Included are 9 diacritics that are required and must be represented by the basic glyph set. They are usually written on top or below a letter altering a letter or ligature glyph when viewed within fixed frame. These are not used extensively by modern Arabic. This means at least 140 distinct basic glyphs must be represented to accommodate all languages based on the extended Arabic (from now on Arabic) character set as defined by Unicode standards version 1.0.

In reality, each of the 140 glyphs above is an abstract representation of a letter, diacritic or a ligature. They mostly represent a distinctive shape (glyph) for a letter or ligature when written in its detached form. But when writing Arabic-based languages, each letter/ligature must change its shape, either significantly or slightly, depending on its position in a word. Some ligatures (e.g. Waw with Hamza above) belong to this basic set. Their position-dependent shapes are handled as if they were letters. Others (e.g. Lam-Alif) must be handled by replacing two basic glyphs with one glyph not included in the basic set. Therefore 2–5 glyphs in average are needed for each letter/ligature when writing these languages. The diacritics produce yet additional different shapes upon combination too.

Since each letter/ligature does not have one uniform shape in all positions, the number of glyphs needed is not constant and is dictated by type unlike in English (always 26 letters). Depending on the calligraphy or type (front), the designer must produce 400–600 distinct glyphs in order to accommodate electronically all these languages. See FIG. 9 for the case of Arabic language.

As a result, a huge number of glyphs would be needed in an article of manufacture with Arabic lettering embodied within (e.g. printer, computer, software and font type or stamping device). In addition, these articles must handle the problem of constant glyph substitutions using involved logical processes.

Arabic is normally read and written from right to left. It is no easily written or read from left to right. But in some applications (e.g. aviation field) training is provided to write it from left to right. Handwriting or reading Arabic from right to left is easy when acquired from childhood. But articles manufactured to utilize the Latin lettering (e.g. computer software and hardware) must be design-altered to accommodate the right to left direction mechanism. Also letters of embodied Arabic words on articles (e.g. transparencies, microfiche, negatives, image printing) look different depending on the direction of reading. Therefore bi-directional reading and writing is difficult using the right to left traditional Arabic lettering.

Unlike English, which is written both attached (script) and detached (regular print), the Arabic letters/ligatures are generally written in an attached form. Most letters/ligatures are attached (joined) with the letters to their right and the letters to their left. Some letters/glyphs must be detached (not joined) with letters on their left side but must be attached (joined) with letters on their right. Few letters/glyphs must be written detached from both sides. Also, in Arabic an optional glyph (Tatweel) of a straight horizontal line (like a dash) is used to prolong words lengths. It can form an arbitrary length. Articles of manufacture designed to produce Arabic lettering (e.g. computer software or hardware based articles) must involve extra and complicated logic or methods to handle the various puzzle-like letter joining and non-joining possibilities. Applications that need equal or fixed letter widths will not be able to handle traditional Arabic fonts easily.

U.S. Pat. No. 5,407,355 to Majzub discloses a method and font for representing Arabic characters. This invention discloses creating segments of characters and adding on to them to create different Arabic symbols. This is a burdensome and time consuming approach for use on articles such as office stationery.

U.S. Pat. No. 4,575,145 discloses an article having invertible lettering thereon. The invention is for the English language and relates to invertible lettering appearing on articles.

U.S. Pat. No. 4,244,657 to Wasylyk discloses a font and a method for printing cursive script in which all the letters are combined to form sets or subsets of individual letters of the font.

U.S. Pat. No. 5,295,238 to Dickson relates to a mathematical font for printing cursive character strings. Neither the patent of Wasylyk nor the patent of Dickson address the need to form fonts of non-cursive, separate distinct characters.

Accordingly, it would be desirable to provide a font and a method for articles to represent the extended Arabic letters as a fixed set of independent characters of unique glyphs which are generally symmetrical to facilitate bi-directional rendering and are detachable to allow non cursive strings input/output.

SUMMARY OF THE INVENTION

It is a principal object of the invention to provide a new distinctive Arabic based alphabets which introduce glyph symmetry and uniformity base and rule of design by representing each letter with one glyph of unique symmetrical and detachable look characteristics resembling traditional Arabic. Keeping this symmetry and uniformity base, one can produce variety of fonts belonging to this distinct alphabet. Changing the design of our glyphs, partially or totally, through systematic and geometric alteration of this base of symmetry found in each glyph will create new fonts to be utilized for their new look, direction suitability, or both, but still belong to the same distinct alphabets. Employing the invention eliminates all major and unique obstacles faced by articles of manufacture utilizing the traditional Arabic based alphabets. This font-only based, system-independent character input/output solution or method is intended to facilitate the use of Arabic lettering on articles designed for Latin lettering applications with a minimum or no alteration of the original design. Text written in these alphabets is readily legible to readers of traditional Arabic. Articles of manufacture with the embodiment of this new lettering (e.g. Latin or Arabic computer software and hardware, software translated into Arabic, transparencies, image printing, translation software, Arabic based languages teaching tools) can be produced with significantly less complexity to deliver Arabic in a form closely resembling the traditional Arabic.

BRIEF DESCRIPTION OF THE DRAWINGS

Figure 1A:
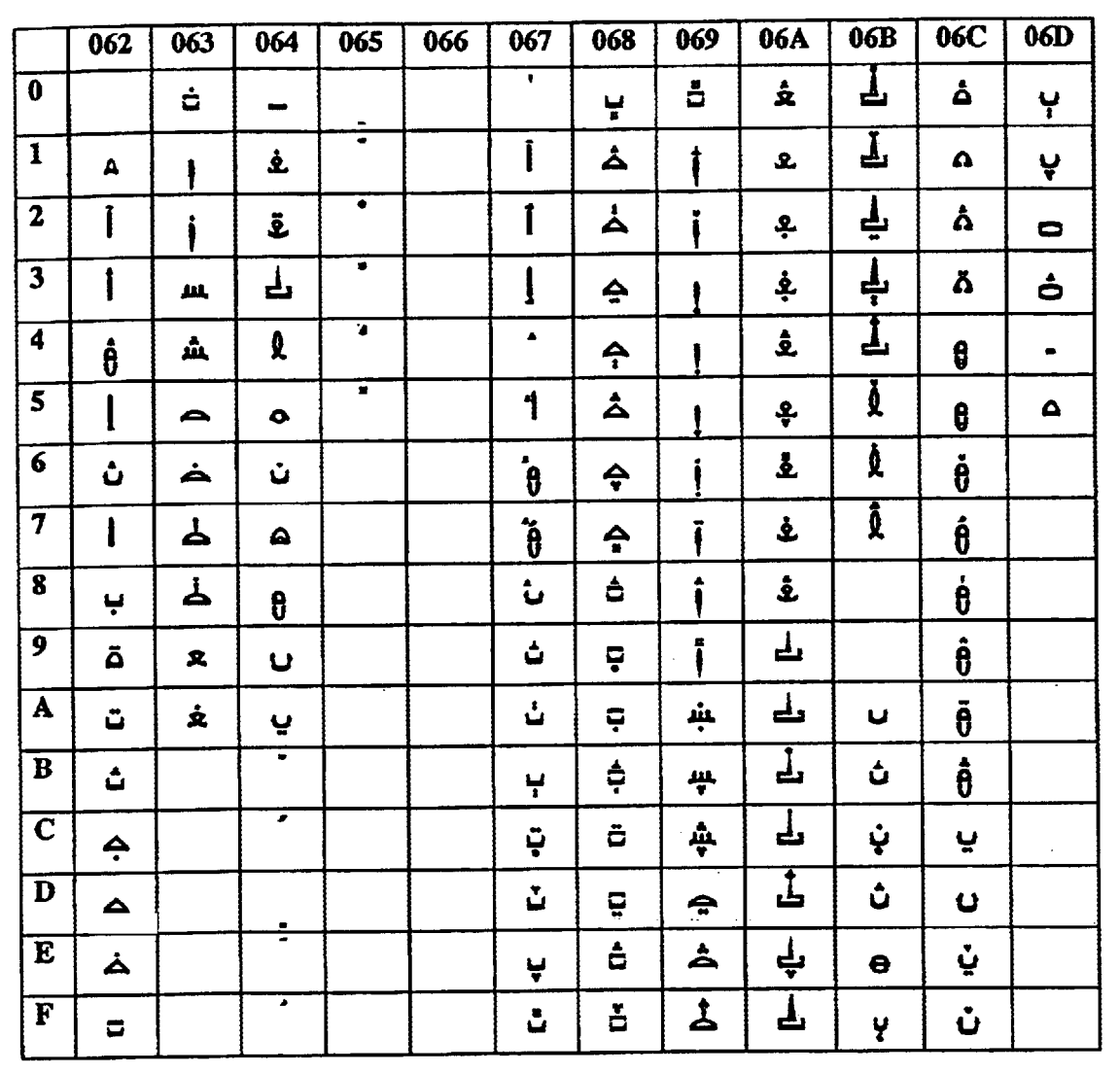
Figure 1B:
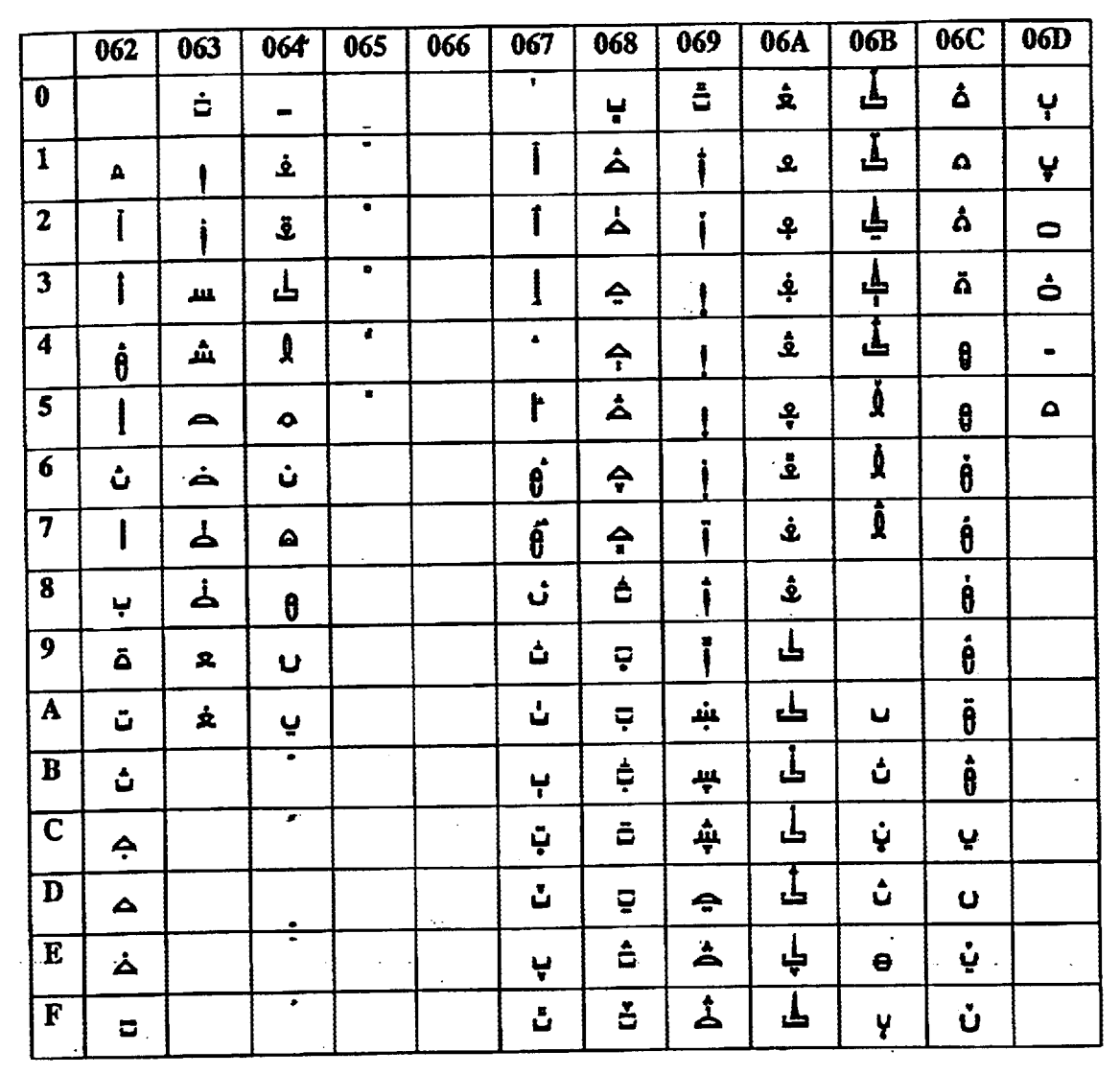

FIG. 1A is a hexadecimal table of the representative characters for the extended Arabic system of the present invention, preferably used for left to right representation;

FIG. 1B is a table of the representative characters for the Arabic alphabet system of the present invention, preferably used for right to left representation;

FIG. 1C is a hexadecimal table of the representative characters for the extended Arabic system of the present invention with glyph symmetry altered, preferably used for right to left presentation.

FIG. 2 if a hexadecimal table of the basic characters of the prior art extended Arabic showing in their isolated form;

FIGS. 3–5 show block diagrams for an input/output system such as a Latin based computer system in which:

FIG. 3 is a block diagram illustrating how the computerized system will typically process a traditional Arabic font which requires software as shown in element box 10;

FIG. 4 is a block diagram illustrating how the same computerized system will process the Arabic font of the present invention as shown in FIGS. 1A, 1B and 1C which does not require the software as shown in element box 10 of FIG. 3;

FIG. 5 is a combined block diagram of FIGS. 3 and 4 illustrating the different paths between the present invention font of FIGS 1A, 1B and 1C by the arrows compared with that for the traditional arabic font and showing how the need for much of the software for the traditional arabic font can be eliminated with the font of the present invention;

FIG. 7 illustrates a sample Arabic text utilizing the fonts of our new invention in right to left format (top illustration), left to right format (middle illustration). The bottom illustration represents the same text utilizing a prior art traditional Arabic font.

FIG. 8 provides illustrates bi-directional rendering of words utilizing our new font invention. Words are written in a left to right order (left column) and a right to left order (middle column). The right column illustrates the same words in traditional Arabic.

FIG. 10 illustrates how using our present invention will eliminate the glyph substitution of FIG. 9 and how the same word of FIG. 9 (bottom illustration) is rendered using five glyphs and no ligature.

FIG. 11 illustrates another facet of the present invention in which the glyph substituted for the "Lam-Alif" ligature can be eliminated;

Figure 12:
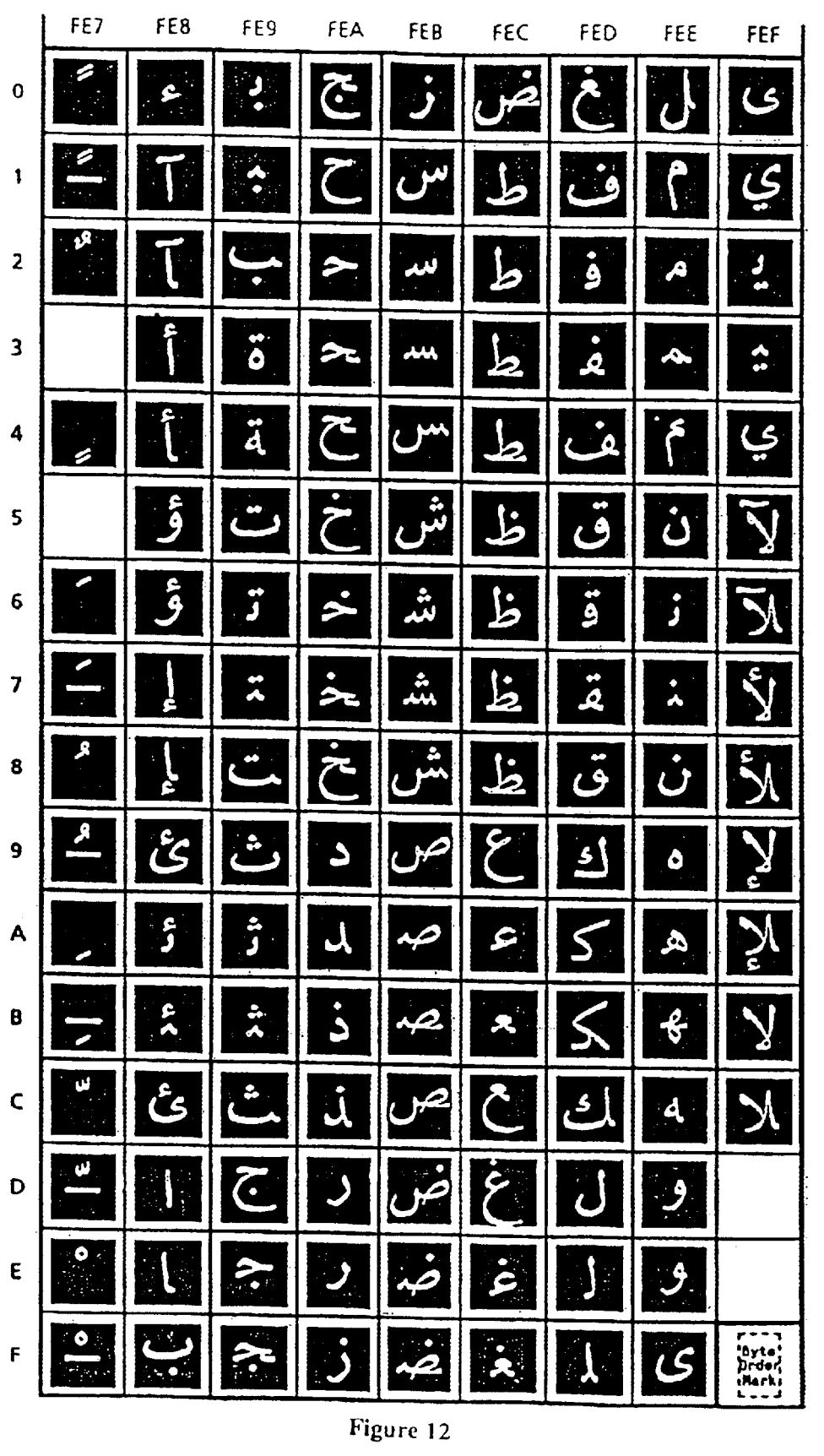

FIG. 12 illustrates the minimum glyph variations needed for the prior art characters in the case of the Arabic language only;

Figure 14:
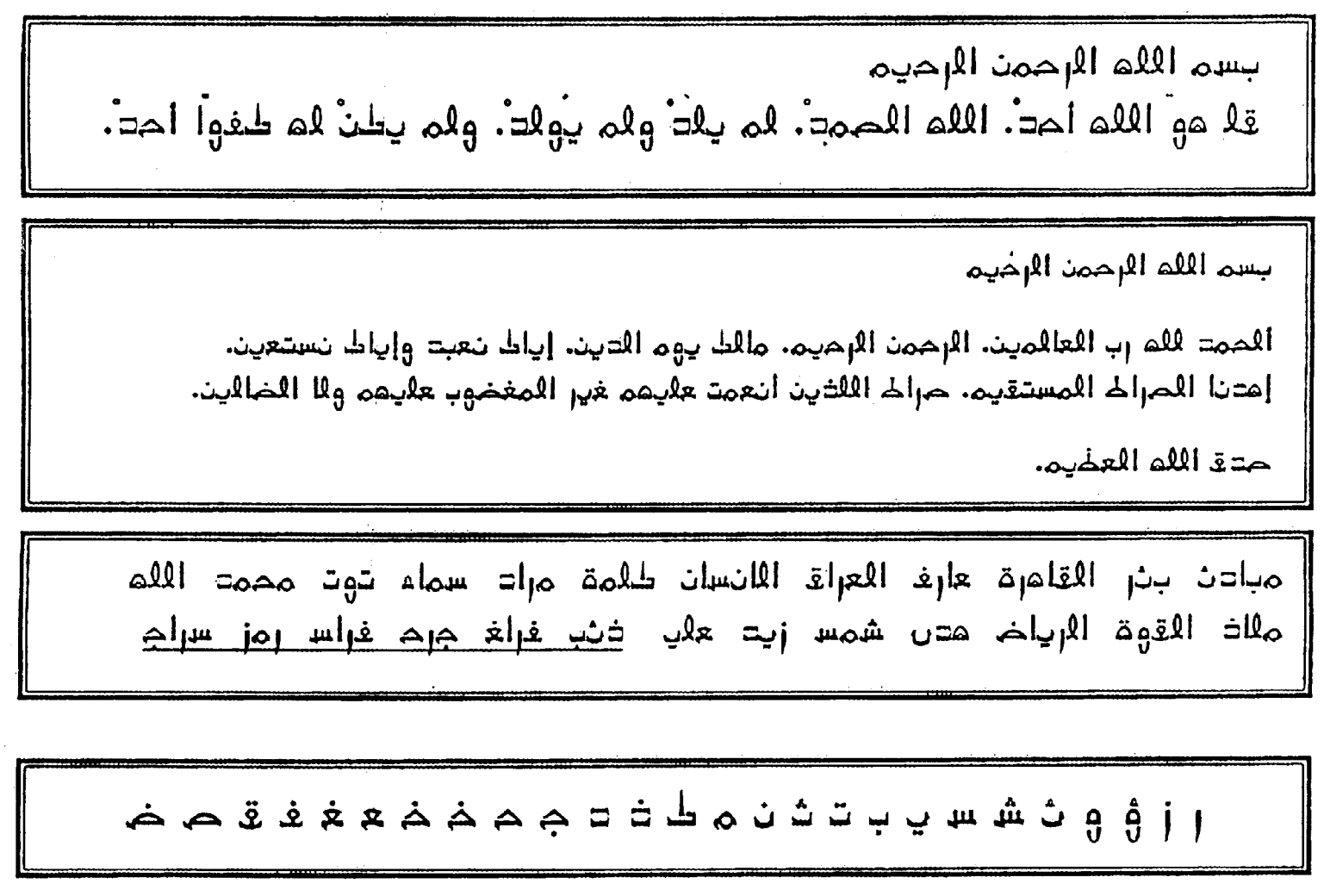

FIG. 14 illustrates three sample Arabic language texts (top three boxes) using our new font but with altered symmetry in 26 glyphs (bottom box). Compare to similar text samples in FIGS. 6–8;

DETAILED DESCRIPTION OF THE PREFERRED EMBODIMENTS

Referring to the invention and in particular FIGS. 1–14, FIG. 1A illustrates a tabulation of representative Arabic characters of the present invention preferably used for left to right representation. FIG. 1B and FIG. 1C illustrates the same for preferably right to left character representation. These newly designed characters can be embodied on any article imaginable from stationary, transparencies, rubber or metal stamps, language learning tools, or typewriter's stamping keys. In addition they can be used in the present invention's font based system independent character input/output system or method such as a computerized input/output system handling Arabic based languages (see FIGS. 3–5 and FIG. 6).

Figure 2:
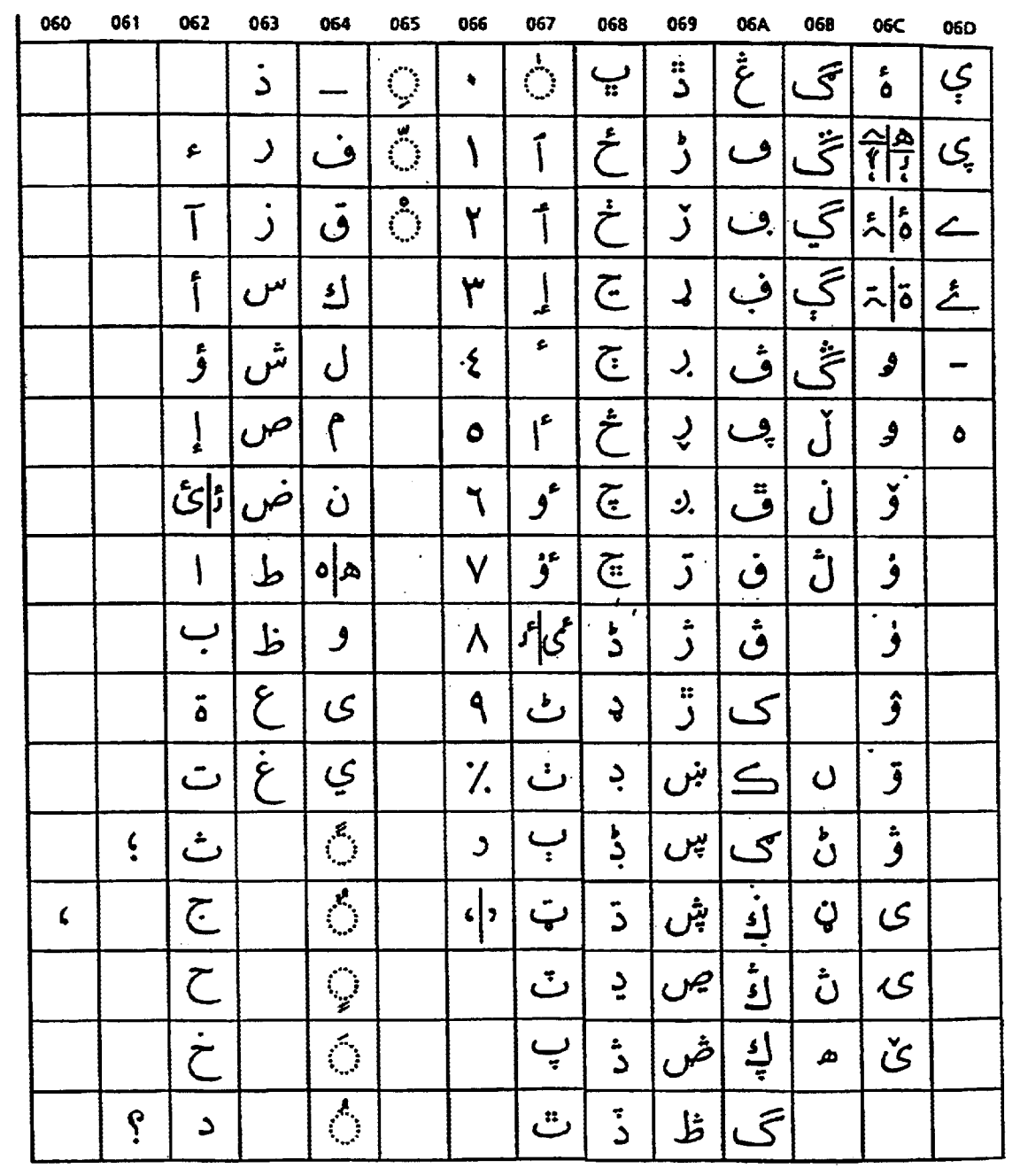

FIG. 2 illustrates the basic letters needed for the traditional extended Arabic shown in their isolated form glyphs as defined by The Unicode Standard version 1.0.

The present invention provides new glyphs that eliminate all required glyph substitutions of the prior art including the ones related to the Alif-Lam ligature.

Figure 3:
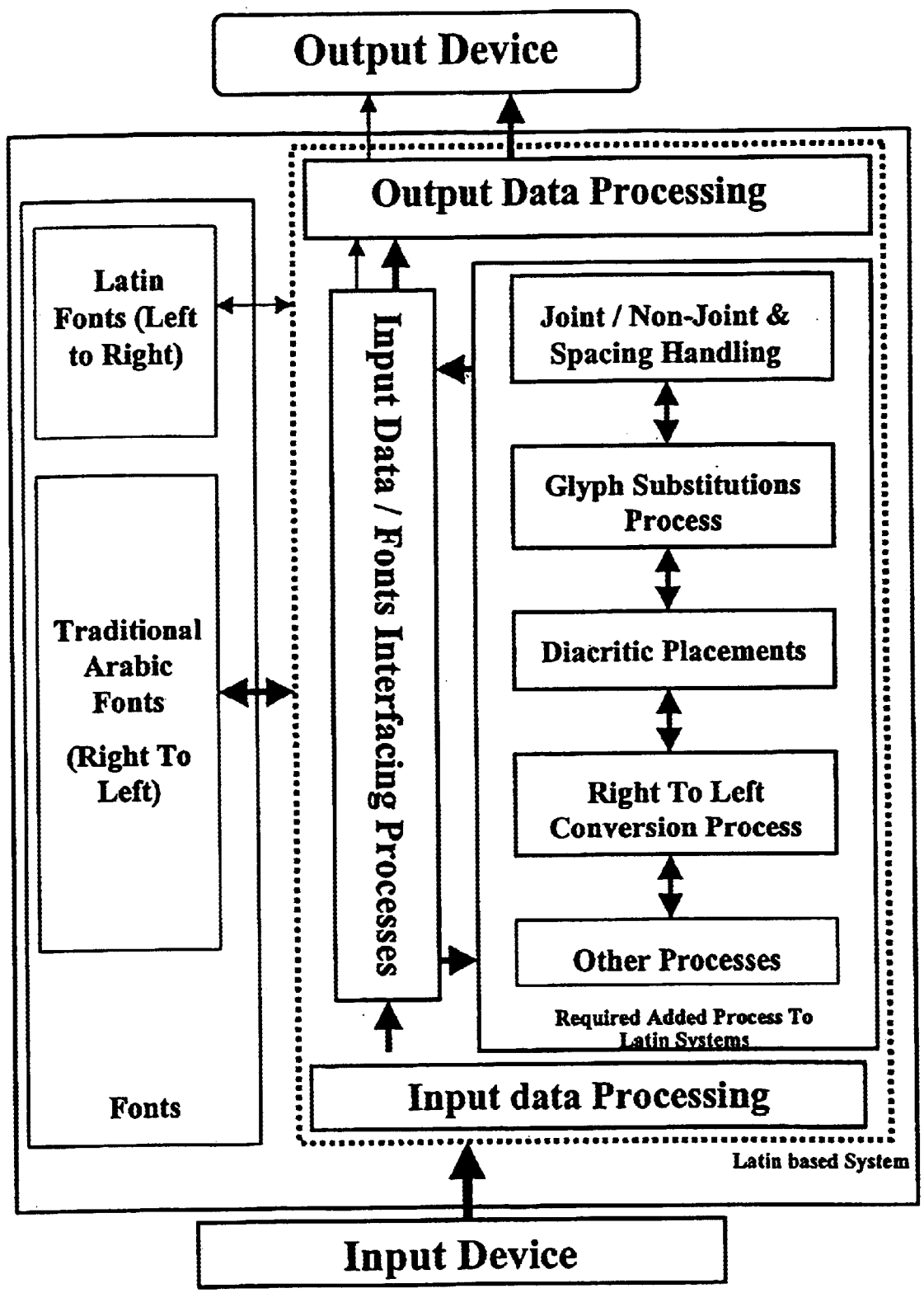
Figure 4:
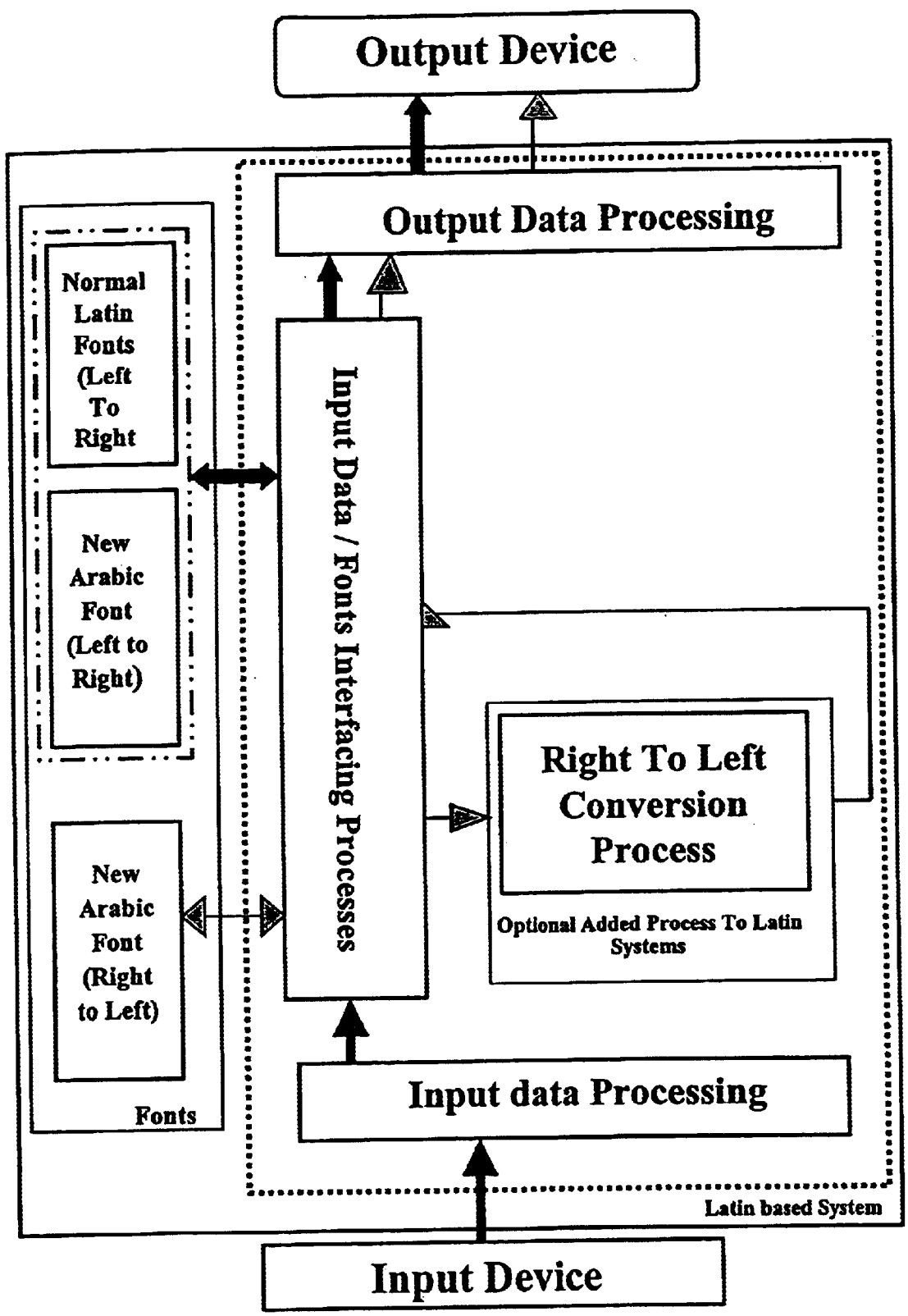
Figure 5:
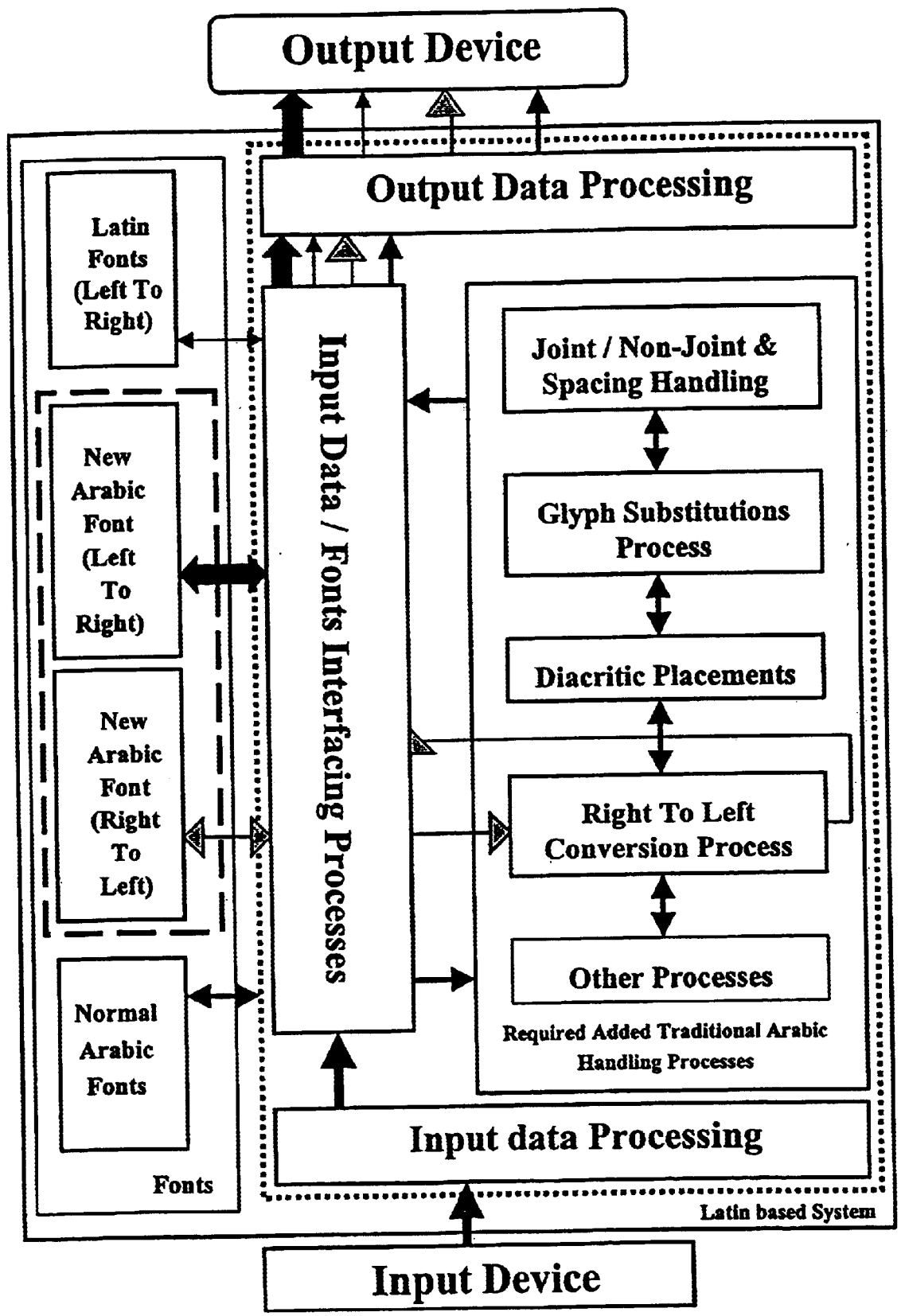
Figure 6:
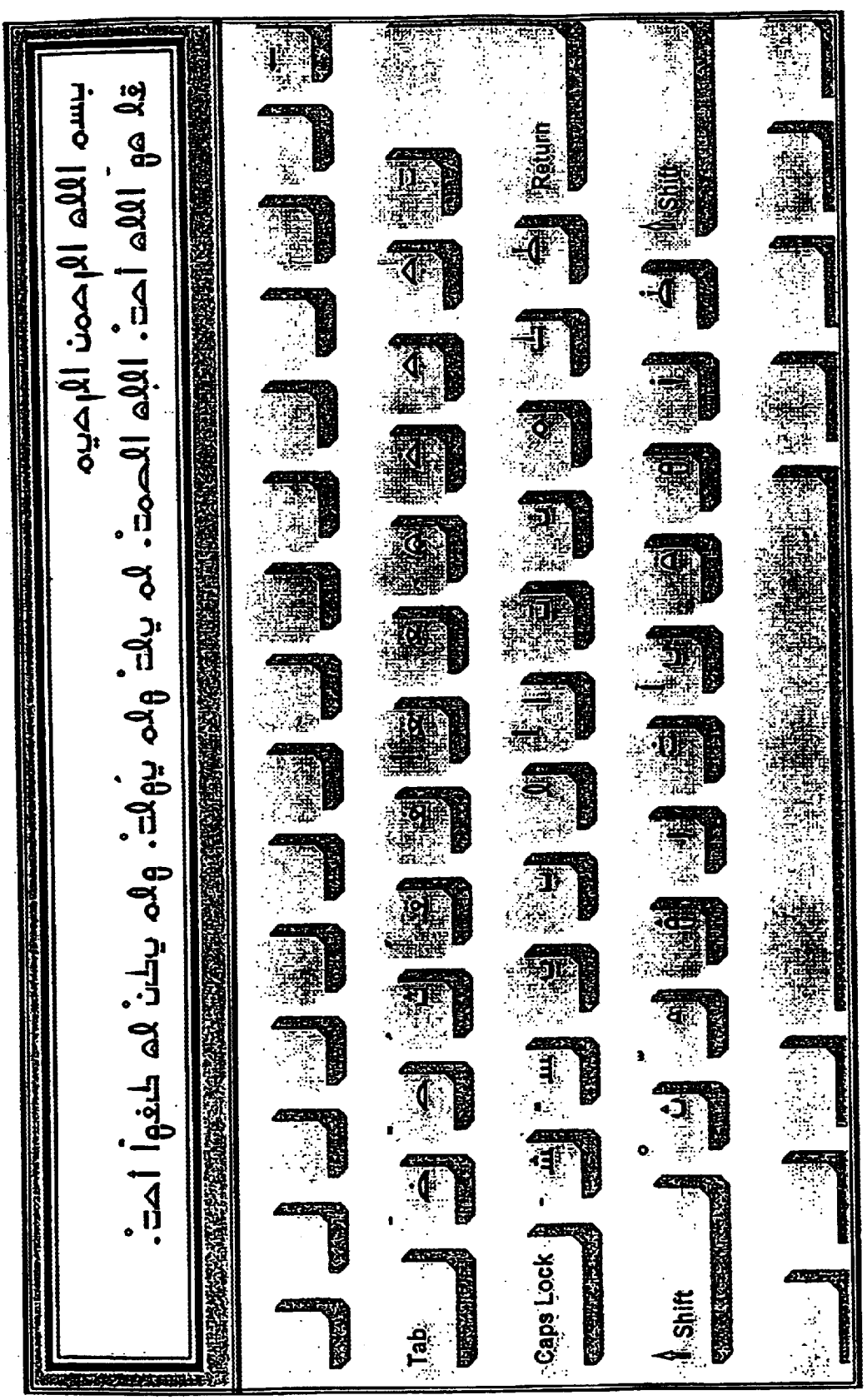
FIG. 6 is an article utilizing the distinct alphabet of the present invention. Notice the uniform relation of one key to one letter to one glyph.
Figure 9:
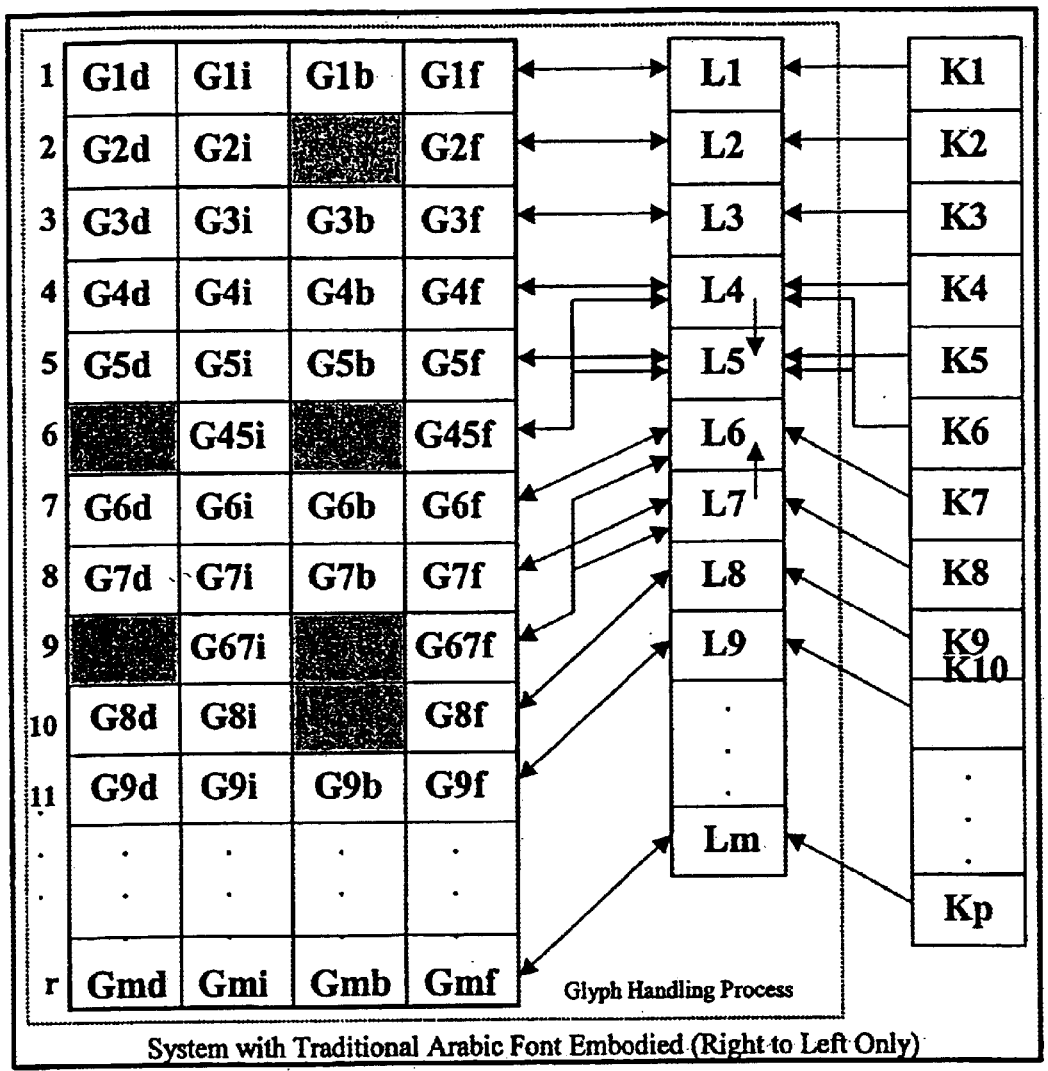
FIG. 9 illustrates the process of glyph substitution which is needed to render prior art traditional Arabic and how a typical five-letter prior art word (bottom illustration) must be rendered using four glyphs and a ligature.

The Alif-Lam ligature elimination above reduces by four the number of keys required to type or input Arabic via an input device. It also produces a one key for one character relation. A keyboard for example can use the four freed spaces for other letters or symbols. FIG. 6 illustrates a possible modification to a standard Arabic language keyboard. Notice the location of the letter "Dhal".

Each glyph of the present invention represents the characteristic features of a basic Arabic letter/ligature glyph and the characteristic features of ALL its varying shapes/glyphs based in the previous art (traditional Arabic) in its position in a word.

In the present invention the glyphs representing letters/ligatures and diacritics of these new distinct Arabic based alphabets are uniform with a one glyph to one letter/ligature relationship as in English.

The present invention provides a system where the alphabets are to be represented by a constant of 140 glyphs compared to the traditional extended Arabic which needs a variable number of glyphs (400–600) depending on type or font to represent its letters/ligatures and diacritics. The number of glyphs needed therefore would NOT be dependent on type or calligraphy.

In the characters of the present invention each new letter/ligature glyph is readily distinguishable from each other. But all glyphs have symmetry, detachability, and uniformity as base and rule for their original design. When flipped horizontally around its vertical axis, each glyph will still be distinctively representing the characteristic features of the same glyph prior to flipping. Each glyph is therefore either exactly symmetric or semi-symmetric around its vertical axis. In effect a glyph looks the same when looking to it from left or right or from right to left.

Figure 13:
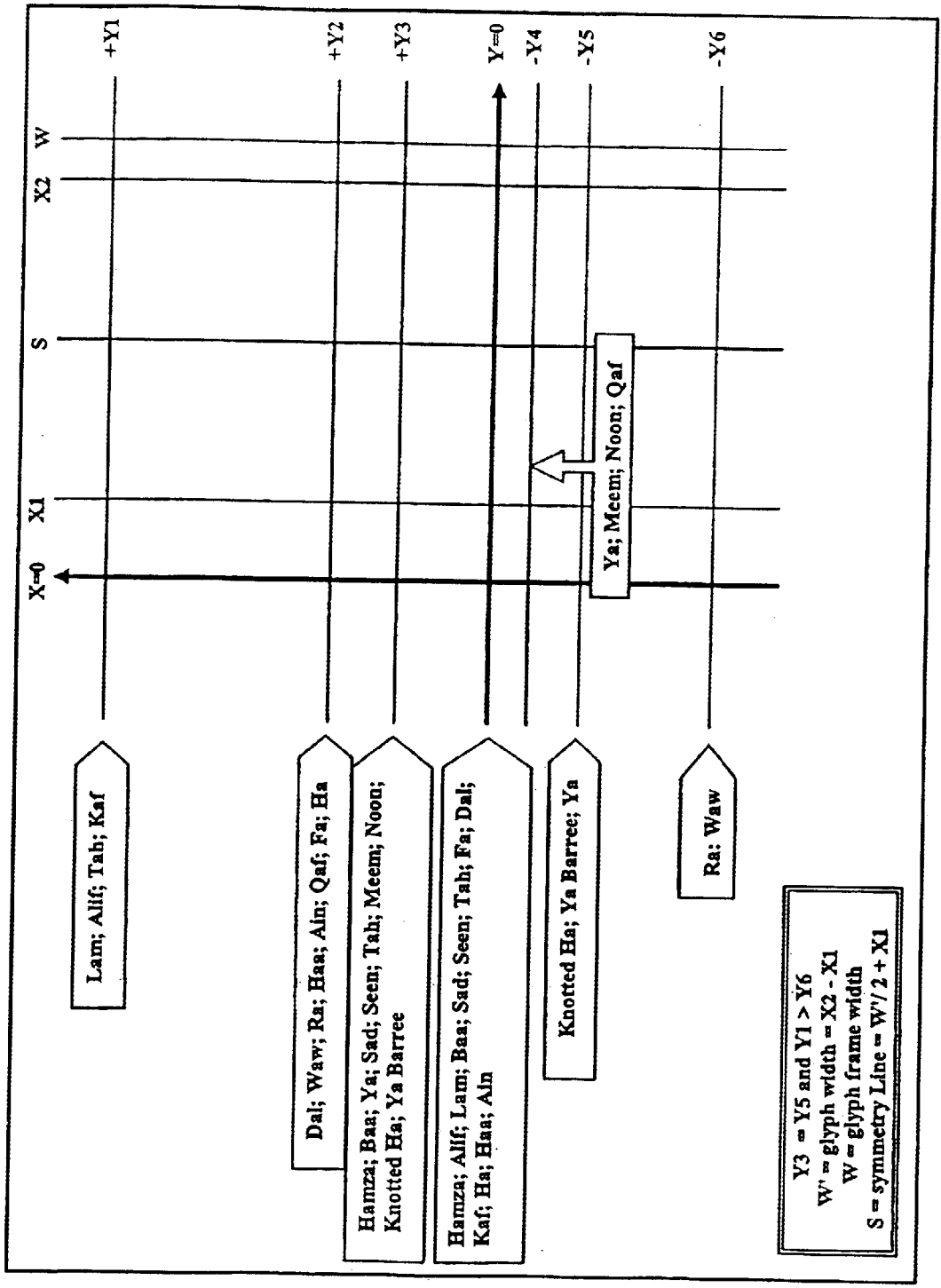
FIG. 13 illustrates frames composed of six horizontal guidelines, and four vertical guidelines for design boundaries for the new glyphs of the present invention.

Further, when placed in a frame individually, the new glyphs are designed to fit uniformly between two of six boundary coordinate values of the y-axis. Placing dots or similar articles above or below is not restricted as can be seen in FIG. 13. Glyphs' widths can be fixed or variable to produce fixed or variable fonts. The X, Y values are variable and design dependent. The figure also illustrates glyphs' line of symmetry and other guide lines.

The glyphs that do not have symmetry in any form or position in the traditional Arabic (e.g. Kaf, Dal) can optionally benefit from a slight alteration of its symmetry to resemble traditional Arabic and therefore are semi-symmetric. Alteration is based on whether it will display right to left or left to right as illustrated by the attached three glyph tables of FIGS. 1A, 1B and 1C.

If the new glyphs of the present invention are altered or redesigned with the observation of our general symmetric and uniformity bases of design, new types or fonts will be produced that belong to the same category as of our distinct alphabets and that will yield its exact functionality.

In the present invention the glyph representation is kept uniform per letter representation. Starting from the invention's base of symmetric design, a slight or major elimination of symmetry in few or all glyphs, when applied systematically or geometrically, will produce a variety of types or fonts. These types can be used for right to left or left to right representations of the present invention. A letter will have its characteristics preserved in both cases. FIGS. 1A, 1B and 1C illustrate the slight variations of the implementation.

When keeping the present invention's uniform single glyph per letter relation and completely eliminating or ignoring symmetry, the resulted glyphs will resemble most closely traditional Arabic characters (or their horizontal inversions) in one of their forms based on their position in a word. Again, resulted types can be utilized as right to left or left to right implementations closely related to the present invention's family.

Keeping the present invention uniform single glyph per letter relation while increasing or decreasing the number of basic characters or keys (m, n, or p in FIG. 10) will follow the same principles behind the present invention. Resulted types are also part of the present invention's family.

Reverse ordering a given word composed of the present inventions' glyphs will produce a word with glyphs that are characteristically identical when looking at them from the opposite direction (see FIG. 8). Therefore, text that is composed in a left to right order can be read from left to right without looking turned around or horizontally flipped as in the case of reading a traditional right to left Arabic text from left to right. See FIG. 7.

Also when combining glyphs to make words, the new letter/ligature glyphs can be written or displayed slightly separated (detached) or attached without losing their unique and distinctive representation of the corresponding letter or ligature. Words of such combinations will look basically the same when written with detached or attached glyphs.

Extra spaces are added statically to the left or to the right (depending on direction of writing) of all letter/ligature glyphs of the traditional Arabic which join with other letters/ligature ONLY from the right BUT can occur in all positions within a word. This solves statically the problem of joining/non-joining letters and ligatures of the traditional Arabic. Namely, spaces are added to glyphs for Dal, Ra, Alef, Waw and their derivative variations. See FIG. 13 and texts of FIGS. 6, 7 and 8. Also see FIGS. 3, 4 and 5.

To display text from right to left or from left to right one would therefore only need to utilize two slightly different overall font implementations of the same glyphs. One for right to left and another for left to right (see FIGS. 1A and 1B for example). A glyph, looked at individually, will have its general characters preserved. Also see FIGS. 3, 4 and 5.

Diacritics in the new alphabets can be added adjacent to the letters and within the spaces produced by two adjacent detached letters. Letters or ligature glyphs look the same when viewed in a frame before and after adding diacritics. See text in FIG. 6. The diacritic "kesra" or "kesretan" would be placed under but adjacent to a word in all cases even when combined with the "Shedda" diacritic.

Optionally, one can include glyphs for some essential traditional Arabic ligatures (e.g. Lam-Alif) or new ones (e.g. Alif-Lam) to improve legibility or typing speed. Such new glyphs must observe general symmetry and uniformity and be added to the basic required characters to keep the one-key, per one-letter, per one-glyph relations of this invention. FIG. 10 illustrates such option as dotted arrows from K6 to L6 to G6. Also see FIG. 11 for possible Lam-Alif and Alif=Lam implementations.

I do not limit myself to any particular details of construction set forth in the specification and illustrated in the accompanying drawings, as the same refers to and sets forth only certain embodiments of the invention, and it is observed that the same may be modified without departing from the spirit and scope of the claimed invention.

Having thus described the invention, what is claimed as new and desired to be secured by Letters Patent is as follows:

1. A method for providing distinctive independent characters representative of arabic characters which are independent in an input/output system comprising the step of:
providing distinctive letters which are uniform, having one glyph per character, either exactly or semi-symmetric and detachable when embodied in arabic lettering for use in text wherein said distinctive letters have substantially a configuration shown in one of FIG. 1A, FIG. 1B or FIG 1C herein.

2. An article utilizing a method according to claim 1 wherein said letters include 140 unique glyphs corresponding to all needed basic extended Arabic letters, ligature, and diacritics and all their glyph variations as defined by a Unicode Standard.

3. An article utilizing a method according to claim 1 wherein glyph substitutions are needed to accommodate letters/ligatures glyphs shape changes as based on their positions in a word.

4. An article utilizing a method according to claim 1 wherein new glyphs eliminate a one-for-two followed by a one-for-one glyph substitutions such as for an Lam-Alif ligature.

5. An article according to claim 4 wherein said Lam-Alif ligature elimination reduces by four a number of keys required to type or input Arabic via an input device and produces a one key for one character relation.

6. An article utilizing a method according to claim 1 wherein each glyph represents characteristic features of a basic Arabic letter/ligature glyph and the characteristic features of all its varying shapes/glyphs based in traditional Arabic on its position in a word.

7. An article utilizing a method according to claim 1 wherein said glyphs representing letters/ligatures and diacritics of new distinct arabic based alphabets are uniform with a one glyph to one letter/ligature relationship as in English.

8. An article utilizing a method according to claim 1 wherein said alphabets are represented by a constant number of 140 glyphs compared to a traditional extended Arabic which needs a variable number of glyphs in a range of 400 to 600 depending on type or font to represent its letters/ligatures and diacritics so that a number of the glyphs needed therefor would not be dependent on type or calligraphy.

9. An article utilizing a method according to claim 1 wherein each new letter/ligature glyph is readily distinguishable from each another, and wherein all glyphs have symmetry, detachability, and uniformity as base and rule for their original design.

10. An article utilizing a method according to claim 1 wherein each glyph when flipped horizontally around its vertical axis will still be distinctively representing characteristic features of the same glyph prior to flipping so that each glyph is therefore either exactly symmetric or semi-symmetric around its vertical axis whereby in effect a glyph looks the same when looking to it from left to right or from right to left.

11. An article utilizing a method according to claim 1 wherein each new glyph when placed in a frame individually is designed to fit uniformly between two of six boundary coordinate values of a y-axis and placing dots or similar articles above or below said each new glyph is not restricted.

12. An article utilizing a method according to claim 1 wherein said distinctive letters are formed either as cursive or detached, non-cursive characters within a text.

13. An article utilizing a method according to claim 1 wherein glyphs that do not have symmetry in any form or position in the traditional Arabic can optionally benefit from a slight alteration of its symmetry to resemble traditional Arabic and therefore are semi-symmetric when alteration is based on whether it will display right to left or left to right.

14. An article utilizing a method according to claim 1 wherein new glyphs altered or redesigned with an observation of general symmetry and uniformity bases of design, new types or fonts will be produced that belong to the same category as of the distinct alphabets and that will yield its exact functionality.

15. An article utilizing a method according to claim 1 whereby keeping our uniform single glyph per letter relation and starting from our base of symmetric design, a slight or major elimination of symmetry in few or all glyphs, when applied systematically or geometrically, will produce a variety of types or fonts and such types can be utilized as right to left or left to right implementations.

16. An article utilizing a method according to claim 1 whereby keeping uniform single glyph per letter relation and completely eliminating or ignoring symmetry, resulted glyphs will resemble most closely traditional Arabic characters or their horizontal inversions in one of their forms based on their position in a word.

17. An article utilizing a method according to claim 1 whereby keeping form single glyph per letter relation while increasing or decreasing the number of basic characters or keys.

18. An article utilizing a method according to claim 1 wherein words composed from our glyphs that have similar spelling but are arranged in opposite directions would be characteristically identical when viewed from either direction of said opposite directions.

19. An article utilizing a method according to claim 1 whereby extra spaces are added statically to the left or to the right (depending on direction of writing) of all letter/ligature glyphs of the traditional Arabic which join with other letters/ligatures only from the right but can occur in all positions within a word thereby solving statically a problem of joining/non-joining letters and ligatures of the traditional Arabic as spaces are added to glyphs for Dal, Ra, Alif, Waw and their derivative variations.

20. An article utilizing a method according to claim 1 whereby in order to display text from right to left or from left to right one would therefor only need to utilize two slightly different overall font implementations of the same glyphs.

21. An article utilizing a method according to claim 1 whereby an optional Arabic glyph for "Tatweel" can still be used without loosing legibility of most characters.

22. An article utilizing a method according to claim 1 wherein diacritics in the new alphabets can be added adjacent to the letters and within the spaces produced by two adjacent detached letters so that letter or ligature glyphs look the same when viewed in a frame before and after adding diacritics.

23. An article utilizing a method according to claim 1 if after including glyphs for some essential traditional Arabic ligatures such as Lam-Alif or new ones such as Alif-Lam to improve legibility or typing speed wherein such new glyphs observe general symmetry and uniformity and are added to the basic required characters to keep the one-key, per one-letter, per one-glyph relations of said article.

24. An article utilizing a method according to claim 1 wherein font-only based, system-independent character input/output solution or method is intended to facilitate the use of Arabic lettering on articles designed for Latin lettering applications with a minimum or no alteration of such systems' original design.

25. An article having a surface, said surface bearing thereon at least one word composed of distinctive letters representative of Arabic lettering, wherein said distinctive letters are uniform, having one glyph per character, generally symmetric and detachably embodied in Arabic lettering for use in a text.

26. An article according to claim 25 wherein said distinctive independent characters having substantially a configuration shown as one of either.

27. A method for providing distinctive independent characters representative of arabic characters which are independent in an input/output system comprising the step of:
providing distinctive letters which are uniform, having one glyph per character, exactly or semi-symmetric and detachable when embodied in arabic lettering for use in text, wherein said alphabets are represented by a constant number of glyphs in a range of 400 to 600 depending on type or font to represent its letters/ligatures and diacritics so that a number of the glyphs needed therefor would not be dependent on type of caligraphy.

28. An article utilizing a method according to claim 27 wherein said distinctive letters have substantially a configuration shown in one of FIG. 1A, FIG. 1B or FIG. 1C herein.

* * * * *